United States Patent [19]
Dorris

[11] Patent Number: 5,082,526
[45] Date of Patent: Jan. 21, 1992

[54] PROCESS OF PRODUCING KRAFT PULPING LIQUOR BY THE OXIDATION OF WHITE LIQUOR IN THE PRESENCE OF LIME MUD

[75] Inventor: Gilles Dorris, Laval, Canada

[73] Assignee: Pulp and Paper Research Institute of Canada, Pointe Claire, Canada

[21] Appl. No.: 505,220

[22] Filed: Apr. 5, 1990

Related U.S. Application Data

[63] Continuation of Ser. No. 299,585, Jan. 23, 1989, abandoned.

[51] Int. Cl.$^5$ .................... D21C 11/04; D21C 11/12
[52] U.S. Cl. .................... 162/30.11; 162/38; 162/82
[58] Field of Search .................... 162/30.11, 82, 29, 38, 162/57

[56] References Cited

U.S. PATENT DOCUMENTS

| | | | |
|---|---|---|---|
| 3,216,887 | 11/1965 | Landmark | 162/82 |
| 4,053,352 | 10/1977 | Hultman et al. | 162/82 |
| 4,507,172 | 3/1985 | Steltenkamp | 162/82 |
| 4,770,742 | 9/1988 | Bonsu | 162/30.11 |

*Primary Examiner*—Steve Alvo
*Attorney, Agent, or Firm*—Lawrence I. Field

[57] ABSTRACT

Sodium sulfide or hydrosulfide is oxidized to produce sodium polysulfide and sodium hydroxide. Under appropriate conditions, the oxidation may be pursued further to convert all the sodium sulfide into sodium thiosulfate. The oxidation is carried out at or above atmospheric pressure in a mixed reactor or in a pipeline reactor, by sparging oxygen or air, in a mixture of white liquor and lime mud particles produced in the recausticizing plant of a kraft mill.

13 Claims, 7 Drawing Sheets

PROCESS OF PRODUCING KRAFT PULPING LIQUOR BY THE OXIDATION OF WHITE LIQUOR IN THE PRESENCE OF LIME MUD

This application is a continuation of Ser. No. 07/299,585, filed Jan. 23, 1989, now abandoned.

BACKGROUND OF THE INVENTION

The present invention relates to the process of recausticizing kraft liquor and more specifically to the production of sodium polysulfide and sodium hydroxide from the oxidation of white liquor.

In the conventional kraft process for the production of wood pulp, wood chips are digested in an alkaline cooking liquor called white liquor. The active components of this liquor are sodium hydroxide and sodium sulfide. Although sodium sulfide hydrolyses to sodium hydrosulfide in white liquor, for the purposes of simplification only sodium sulfide is referred to throughout the text of this specification.

It is known that an increase in carbohydrate yield in a kraft cook can be achieved by the addition of sodium polysulfide to the conventional white liquor. Reference is made to this process in an article published by Svenesk Papperstidn. 49(9):191, 1946 by E. Haegglund. Sodium polysulfide acts as a stabilizing agent of carbohydrates towards alkaline peeling reactions. Thus polysulfide cooking results in a significant pulp yield gain which then provides increased pulp production permitting increased liquor throughput in recovery at the same total solids or thermal load.

One manner of producing polysulfide is to add elemental sulfur to a white liquor which is disclosed in Canadian Patent No. 444,274 to Fuller and Woodside. This approach, however, leads to an imbalance of sodium and sulfur in the kraft recovery process. The end result is a progressive increase in the sulfidity of the white liquor and an eventual increase of sulfur gases emissions. The extra sulfur which is lost in the environment represents a pollution source which is no longer tolerable. An alternative approach to adding sulfur to white liquor for producing polysulfide, is to convert the sodium sulfide already present in the white liquor to polysulfide by an oxidation process. Based on this approach, several processes for the continuous production and recovery of polysulfide have been published. The different methods have been reported by Green, R. P. in Chemical Recovery in the Alkaline Pulping Process, Tappi Press, pp. 257 to 268, 1985 and by Smith, G. C. and Sanders F. W. in U.S. Pat. No. 4,024,229. These procedures generally involve redox, catalytic or electrochemical processes.

One process for converting sodium sulfide is described by Barker in U.S. Pat. No. 3,470,061 relating to the redox formation of polysulfide by treatment of a liquor containing sulfide with an insoluble manganese oxide with a manganese valence greater than two. After oxidation of sulfide to polysulfide by the manganese oxide, the spent manganese oxidant, which is insoluble in the polysulfide liquor, can be physically separated and reused after partial regeneration by oxidation with air. As disclosed by Barker and Ma in Tappi report 56 (5), 112, 1973, the overall oxidation can be formulated as:

$$xNa_2S + (x-1)MnO_2 + (x-1)H_2O \rightarrow Na_2S_x + (x-1)MnO + (2x-2)NaOH \quad (1)$$

where x has typically a value of 2.

The regeneration of the manganese oxidant with air can be expressed as:

$$MnO + \tfrac{1}{2}O_2 \rightarrow MnO_2 \quad (2)$$

The process for the regeneration of manganese oxide, which includes separation, drying and oxidation, has been described by Barker and Ma in U.S. Pat. No. 2,653,824. Because the process requires a large amount of metallic oxidant to produce enough polysulfide to obtain a significant pulp yield increase, an alternative method to regenerate the metallic oxidant has been proposed by Barker and Becker in U.S. Pat. No. 3,860,479. In this last process a clear white liquor is fed in the bottom of a packed tower which contains a catalyst selected from one of the oxides of manganese, iron, cobalt, zinc, aluminum, nickel and chromium or from one of the sulfides of manganese, nickel, copper, iron and cobalt. Simultaneously air or oxygen is also fed in the bottom of the tower and the oxidized liquor is continuously removed from the top of the tower. For a liquor with a sulfide concentration of 30.2 grams of $Na_2S$ per liter (as $Na_2O$), the polysulfide level of the white liquor exiting a laboratory reactor tower ranged between 6.0 and 7.5 grams of polysulfide sulfur per liter for a 17 hour period.

A further process for the production of polysulfide from kraft white liquor oxidation is disclosed by Smith and Sanders in U.S. Pat. No. 4,024,229. The oxidation of white liquor with air or oxygen occurs in the presence of partially wet proofed activated carbon catalyst and is based on the following reactions:

$$2Na_2S + O_2 + 2H_2O \rightarrow 2S + 4NaOH \quad (3)$$

$$xS + Na_2S \rightarrow Na_2S_{x+1} \quad (4)$$

where x has a typical value of 1.

The sulfide and polysulfide may also react with oxygen to produce thiosulfate:

$$2Na_2S + 2O_2 + H_2O \rightarrow Na_2S_2O_3 + 2NaOH \quad (5)$$

$$2Na_2S_2 + 3O_2 \rightarrow 2Na_2S_2O_3 \quad (6)$$

It is presently considered that oxidation of sulfide in white liquor with air or oxygen is very slow without a catalyst and leads mostly to the formation of thiosulfate as shown in reactions 5 and 6, rather than polysulfide as shown in reactions 3 and 4. However, it has been suggested that the presence during oxidation of a granular grade of activated carbon treated with polytetrafluoroethylene to provide wet-proofing over a portion of the surface of the carbon, results in a large increase in the rate of sulfide oxidation and in a substantial formation of polysulfide. The mechanism of action of the hydrophobic surface is not well understood. It is believed, however, that the polysulfide reaction takes place essentially at the solid surface whereas the thiosulfate reaction occurs in the bulk of the sulfide solution. This conception is disclosed by an article in the Paper Trade Journal 159(13), 38–41, May 1 1975., Smith, Knowles and Green.

The process disclosed in U.S. Pat. No. 4,024,229 has a vertical or cylindrical vessel, referred to as a reactor containing the wet-proofed activated carbon catalyst in a fixed bed. The oxidation of white liquor in the reactor is accomplished with compressed air. It has been reported that the lime mud particles dispersed in white liquor, as a result of incomplete separation of the mud from the white liquor in the recausticizing plant of the kraft mill, tend to contaminate the catalyst bed and reduce its activity. Thus, to prevent deactivation of the bed with lime mud, the white liquor pumped to the reactors needs to be extremely clear which usually necessitates the passage of the clarified white liquor through polishing filters placed between the reactor and the white liquor separation unit. The oxidized kraft white liquor from the process, which is sometimes referred to as orange liquor, produces 4.6 g/L of polysulfide sulfur for an initial sulfide concentration of 24 g/L (as $Na_2O$) and 9.8 g/L of polysulfide sulfur for initial sulfide concentrations of 48 g/L (as $Na_2O$).

A process similar to that disclosed in U.S. Pat. No. 4,024,229, but using a different catalyst is disclosed in Japanese Patent No. 61,259,754. The catalyst in the packed bed is shown to be made of active carbon granules with 0.2 to 4 mm particle size and a macropore volume of 0.25 cc/g of which 35% consists of pores with a diameter greater than 100 nm. However, unlike the catalyst used in U.S. Pat. No. 4,024,229, no wet-proofing treatment of the carbon surface is apparently required to favor polysulfide formation. It has been suggested that oxidation of sulfide is controlled by internal diffusion (see Hara, S. and Ono, T., Japan Tappi Journal 58(1): 46-51 (1988); Ohgushi, Y. and Hara S-I, in "Preprints of the 1988 Spring Conference, CPPA, May 19-21, 1988, Jasper, Alberta, Canada). Initial results have indicated that with this activated carbon catalyst, the polysulfide concentration in the oxidized liquor is 5.7 g/L (as sulfur) for an initial sulfide concentration of 24.4 g/L (as $Na_2O$).

For the production of polysulfide, it is apparent that the formation of thiosulfate from reactions 5 and/or 6 is not desirable because thiosulfate is an inert species during cooking. There are, however, other applications in the kraft process where the full oxidation of sulfide to thiosulfate may be desirable.

White liquor can represent an inexpensive source of sodium hydroxide for the purification of flue gases, for oxygen pulping and bleaching processes and for extraction stages of bleaching sequences using chlorine or chlorine dioxide. The major problem with the use of white liquor is the formation of hydrogen sulfide when the pH of the stream falls below 10. Moreover, even when the pH of the process lies above 10, the sulfide in white liquor affects adversely the brightness and the viscosity of the pulp in pulping and bleaching processes using oxygen and in bleaching sequences using chlorine or chlorine dioxide. These problems can be eliminated, however, if the sulfide is entirely converted to thiosulfate in an oxidation stage.

Smith and Sanders in U.S. Pat. No. 4,162,187 describe how the oxidation of white liquor with wet-proofed active carbon catalyst of the process described in U.S. Pat. No. 4,024,229 can be carried out to further oxidize the polysulfide to thiosulfate as shown in reaction 6. A procedure for oxidizing sodium sulfide in white liquor to produce sodium thiosulfate has been disclosed by Hultman, in U.S. Pat. No. 4,053,352. In one embodiment of this invention, the white liquor is oxidized at a temperature within the range of about 50° C. to 130° C. and without the use of catalyst by injecting air into the liquor while maintaining an air flow within the range of about 50 to 150 m$^3$/hr.m$^2$ at standard conditions and with no catalyst. Laboratory tests indicated that the rate of oxidation in small scale equipment was low without a catalyst and that the rate increased with increasing temperature and flow rate. It was also shown that by conducting the test in pilot plant scale equipment, the rate of oxidation increased significantly due to the higher liquid height in the pilot plant reactor.

Thus it has been shown that a number of processes are available to produce polysulfide or thiosulfate from the oxidation with air or oxygen of sulfide in white liquor. However, of all the known processes for polysulfide production, only the method disclosed in U.S. Pat. No. 4,024,229 and a recent modification of this process has reached commercial status. The main disadvantages of this oxidation process are the high capital cost of the equipment, the cost of the carbon catalyst, the progressive deactivation of the catalyst and the frequent acid washes required to reactivate, at least partly, the contaminated catalyst. A simplified process to produce sodium polysulfide or sodium thiosulfate from the oxidation of sodium sulfide is, therefore, required.

SUMMARY OF THE INVENTION

It is an aim of the present invention to provide a simplified process for the production of sodium polysulfide or sodium thiosulfate from the oxidation of sodium sulfide in a kraft white liquor.

It has surprisingly been found that when white liquor is oxidized in the presence of lime mud particles and with a sufficient degree of gas dispersion, the rate of oxidation is much higher than when the white liquor is oxidized without the lime mud particles. The concentration of polysulfide in the white liquor oxidized according to the present invention approaches that obtained by the more expensive process disclosed in U.S. Pat. No. 4,024,229. One of the advantages of the present process is that the catalyst is already an inherent part of the conventional white liquor preparation process produced during the causticizing of a kraft liquor with lime. Furthermore, it is another advantage that the equipment and conditions to carry out the present process may be the same as that used for the causticizing of green liquor with lime.

It has further been found that a typical white liquor containing lime mud particles and having preferably a sulfide concentration between 25 and 50 g/L (as $Na_2O$) is oxidized with air or oxygen at temperatures ranging between 90° and 105° C. in a stirred reactor, which may or may not be under increased pressure. The catalyst for the oxidation consists of lime mud particles which are produced in the recausticizing plant of a kraft mill during the causticizing of green liquor with lime. The catalyst is, therefore, already part of the process of preparation of the conventional white liquor whereas in the process disclosed in U.S. Pat. No. 4,024,229 the lime mud is considered a contaminant of the carbon catalyst and is generally removed. The chemical composition of the lime mud particles is variable because the type and level of impurities changed from mill to mill, but the major component is always calcium carbonate.

The present invention provides in a process of recausticizing kraft liquor containing sodium sulfide wherein kraft green liquor is causticized with lime to produce kraft white liquor and leave a residue of lime mud, the improvement comprising the steps of oxidizing the kraft white liquor in the presence of the lime mud to convert sodium sulfide to sodium polysulfide and sodium hydroxide. In another embodiment, oxidizing continues to produce sodium thiosulfate.

There is also provided a process for production of sodium polysulfide from kraft liquor containing sodium sulfide comprising the steps of causticizing a kraft green liquor with lime to produce a kraft white liquor containing sodium hydroxide and a residue of lime mud, and oxidizing the kraft white liquor in the presence of the lime mud to convert sodium sulfide to sodium polysulfide and sodium hydroxide.

The sodium polysulfide efficiency is calculated on a sulfur basis from the formula:

$$\frac{\text{sodium polysulfide formed by weight} \times 100}{\text{converted sodium sulfide by weight}}$$

If an efficiency of about 100 is achieved, then most of the oxidized sodium sulfide is converted to sodium polysulfide. If the efficiency is below 100 which is found to generally be the case, then a portion of the oxidized sodium sulfide has been converted to sodium thiosulfate, and the remainder is sodium polysulfide. An efficiency of 70% would indicate 70% sodium polysulfide and the remainder sodium thiosulfate.

The process can be varied to suit specific requirements, for instance, metal impurities particularly manganese oxide increases the polysulfide efficiency. Other variables include time of oxidizing, selection and flow of oxygen or air through an efficient sparging system and also the percentage of sulfide conversion that occurs. If the oxidizing step is long, then the oxidation step may form all sodium thiosulfate rather than sodium polysulfide.

BRIEF DESCRIPTION OF THE DRAWINGS

FIG. 9 shows a graph of the variation in concentrations of sulfide, polysulfide and thiosulfates during the conversion process with a metallic impurity in the lime mud.

DESCRIPTION OF THE PREFERRED EMBODIMENT

Figure 1:
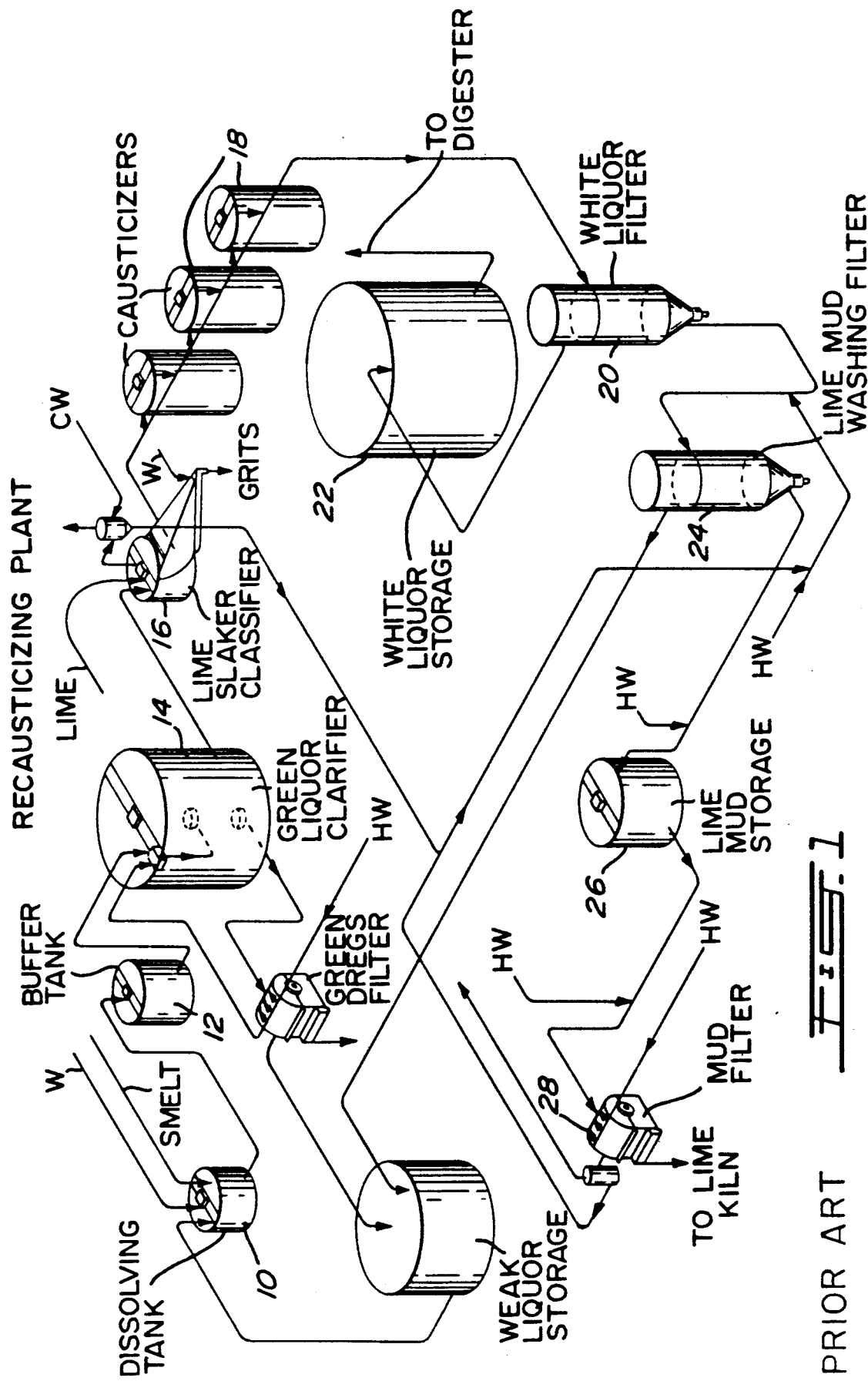
FIG. 1 is a diagrammatic layout of a recausticizing plant in a kraft process mill as known in the prior art.

In a conventional kraft liquor cycle, the digestion of wood chips takes place in an aqueous mixture of sodium hydroxide and sodium sulfide called white liquor. After the cooking operation, the waste liquor, sometimes referred to as black liquor, is separated from the pulp fibres, concentrated and burnt in a recovery furnace to form a smelt. The smelt, which consists mainly of sodium carbonate and sodium sulfide, is then dissolved in an aqueous solution, usually a weak wash, to form the green liquor. FIG. 1 shows schematically a recausticizing plant wherein the smelt and water are added to a dissolving tank 10. The raw green liquor is passed through a buffer tank 12 into a clarifier 14 where the dregs, comprising mainly carbon particles and metallic compounds insoluble in the green liquor are removed. The clarified green liquor is then mixed with lime in the slaker 16 to convert the sodium carbonate into sodium hydroxide in accordance with the formula:

$$CaO + Na_2CO_3 + H_2O \rightarrow 2NaOH + CaCO_3 \qquad (7)$$

During this reaction the lime and calcium carbonate are insoluble and are, therefore, present in the liquid as suspended solids. Several other impurities coming from the lime or from the dregs are also insoluble and become part of the suspended solids and the mixture of these insoluble compounds forms the lime mud.

To complete the reaction, the slurry, which comprises sodium hydroxide and calcium carbonate particles, is passed through a series of agitated vessels called causticizers 18. The slurry is allowed to react at temperatures between about 90° and 105° C. for a period varying from 60 to 180 minutes. The reacted mixture is then passed to a clarifier or white liquor filter 20 to separate the lime mud from the white liquor. The white liquor goes to the white liquor storage for use in the digestion of wood chips and contains mostly an aqueous solution of sodium hydroxide and sodium sulfide.

The thickened lime mud, in the embodiment shown, is washed in a lime mud washing filter or sedimentation tank 24, passes through a storage tank 26 and a mud filter 28 where it is dewatered and then is calcined in a lime kiln or in a fluidized bed calciner to yield reburned lime which is then reused for causticizing green liquor in the slaker 16.

In plants which follow the process described in U.S. Pat. No. 4,024,229 the oxidation stage is carried out after separation of the white liquor from the lime mud. Thus the oxidation with the carbon catalyst takes place in special equipment located between the white liquor filter 20 and the white liquor storage tank 22.

In the present application the oxidizing step occurs inside the recausticizing plant when the white liquor and the lime mud are still mixed together and in one embodiment in at least one of the causticizers 18.

In a commercial process the oxidizing may occur under pressure, and in a pipe line reactor which may be connected directly to a causticizer 18, or alternatively located in the down flow from the white liquor filter 20.

If the oxidizing step occurs in one or more causticizers, air or oxygen is introduced from one or several spargers immersed deeply in the white liquor containing the lime mud particles.

Figure 2:
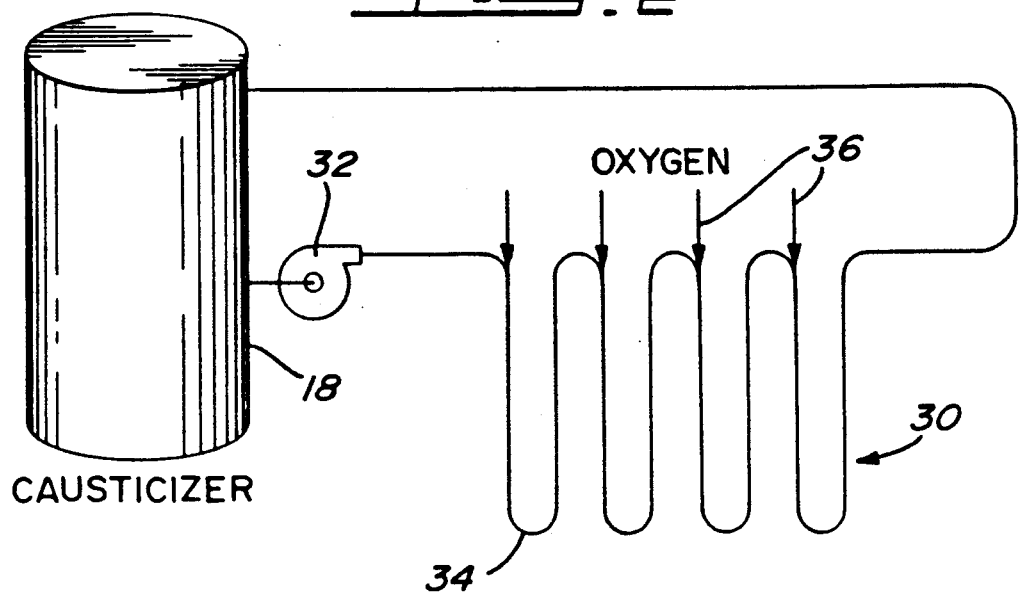
FIG. 2 is a diagrammatic layout of a pipe line reactor for oxidizing kraft white liquor according to one embodiment of the present invention.

FIG. 2 illustrates a pipe line reactor 30 from a causticizer 18. The white liquor containing mud particles is pressurized by a pump 32 and passed at high pressure through a series of looped pipes 34 and back into the causticizer 18. Oxygen or air is injected through nozzles 36 at loop bends. In one embodiment, pressure is of the order of 1000 kilopascals, the length of the pipe line reactor is about 45 meters and retention time in the reactor is about 2 minutes. Whereas the pipe line reactor 30 is shown connected to a causticizer 18, in another embodiment it is located in the down flow from the white liquor filter 20 so that the oxidizing step occurs between the white liquor filter 20 and the lime mud washing filter 24.

For test purposes, the causticizing and oxidation reactions are carried out substantially simultaneously rather than consecutively because as soon as lime is added to a green liquor, reaction commences. Once reaction has commenced, lime mud is formed, thus the oxidizing step can be started very shortly thereafter. Both steps may be carried out in a single vessel although in a production kraft mill separate locations for the two steps may be preferable.

The concentration of lime mud particles in white liquor during the causticizing step lies typically between 90 and 500 g/L and the specific surface area between 3 and 6 square meters per gram. Although the specific surface area of the mud particles is relatively low, the total surface area of solids per liter is high between about 270 and 780 square meters.

Variations in process control occur when the oxidation is carried out with fine bubbles of air or oxygen sparged into causticizers where the temperature is elevated and the agitation intensity is varied. Furthermore, the retention time may be varied and the liquid level controlled, so that the interfacial area and number of contacts between the oxidant, be it air or oxygen, the reductant (sodium sulfide) and the catalyst (lime mud) is high thus favoring the oxidation of sulfide in white liquor.

Another aspect of the present invention is the role of metallic impurities in the lime mud. The lime mud produced in the recausticizing plant is made from reburned lime and is the solid reaction product of the causticizing reaction as shown in equation 7. The impurities in the lime mud are called non-process elements because they are not among the active pulping chemicals in the kraft process. The accumulation of non-process elements in the lime mud cycle depends on the input rate, the degree of closure of the chemical cycle and the specific purges of individual elements (Frederick, W. J., AICHE, Symp. Ser. 239 80:21, 1984). The impurities that may affect the selectivity in the catalytic activity of lime mud during the oxidation of white liquor are likely to be oxidizing agents. Oxides of manganese, iron, cobalt, zinc, aluminum, vanadium and copper, for example, are possible oxidants in the lime mud. Of these substances, only the oxides of iron, aluminum and manganese are at a sufficiently high concentration in the lime mud to be considered important. Wood is generally the main source of these metal ions and accounts for nearly all input of manganese. However, process water and makeup lime may also be an important source of aluminum and iron. The level of these impurities in the mud cycle depends on the wood species, the chemical composition of the make-up lime, the efficiency of the dregs removal from kraft green liquor and the degree of closure of the mud cycle. If these impurities in lime mud are found to play an important role during the oxidation of white liquor, it is possible to alter their level in the mud by, for example, burning the dregs in the lime kiln. These levels may also be changed by increasing the degree of closure of the mud cycle and by selecting a proper makeup lime. Furthermore, it is possible to enrich the mud in metallic oxidants by direct additions of these substances to the lime mud cycle.

Although the concentration of these oxidants in the lime mud may be low, their effect on polysulfide and/or thiosulfate generation is high because as these oxidants get reduced during the oxidation reaction, they are continuously reoxidized by the air or oxygen sparged in the stirred tanks or pipe line reactor. Moreover, even if a fraction of these metallic oxidants are reduced after the oxidation reaction, the oxidative calcination of lime mud in the lime kiln tends to reactivate these oxidants in the lime.

EXAMPLES

Figure 3:
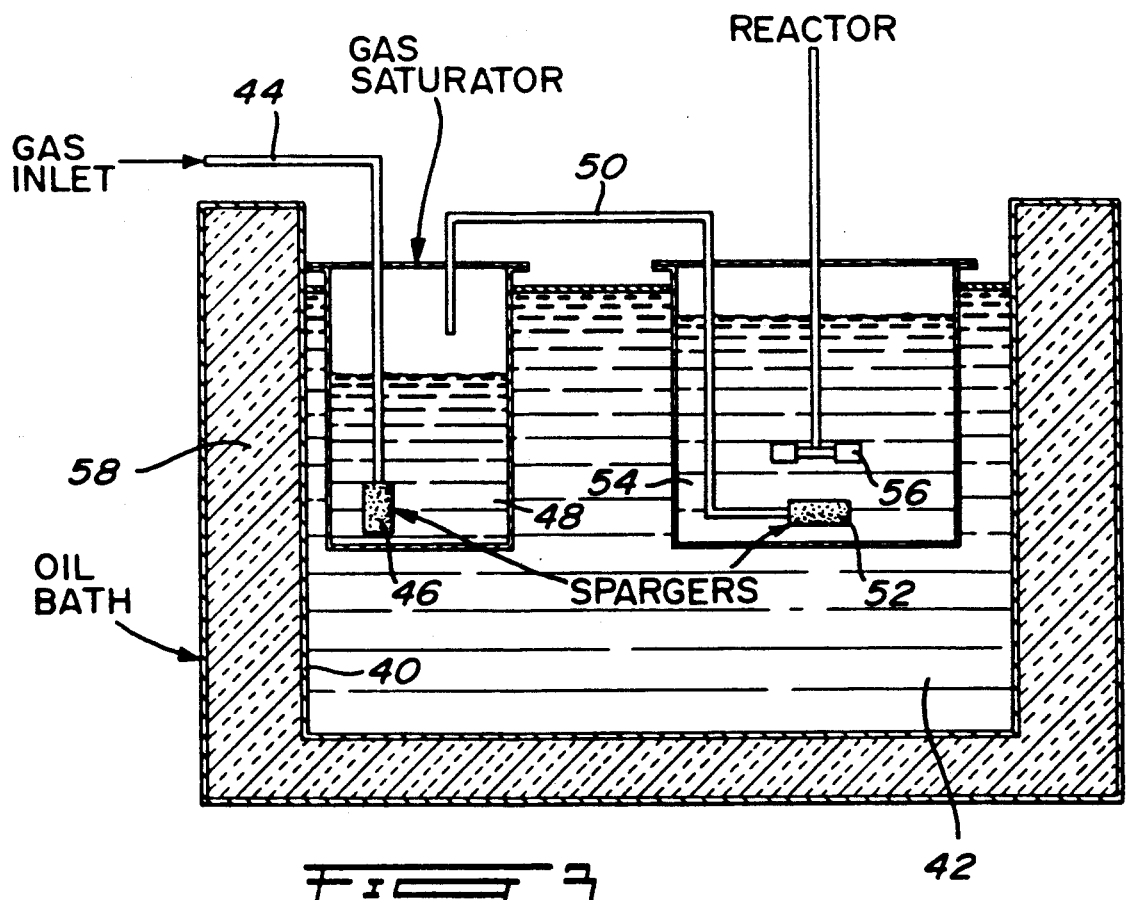
FIG. 3 is a sectional diagrammatic view showing a test vessel used for carrying out the process of the present invention.

A number of oxidation experiments were carried out in a laboratory scale. The tests were conducted in the apparatus as shown in FIG. 3 which comprises a one liter vessel 40 immersed in a thermostatically controlled oil bath 42. Gas, which was either air or oxygen, was first passed through a gas line 44 and sparger 46 into a gas washing bottle or saturator 48 from whence the saturated gas is passed in a second gas line 50 to a sparger 52 within a reaction vessel 54. The gas saturator 48 minimizes evaporation losses from the reactor for test purposes. A stirrer 56 provides agitation to the reactor 54 and the oil bath 42 has an insulating jacket 58 surrounding it.

EXAMPLE 1

Figure 4:
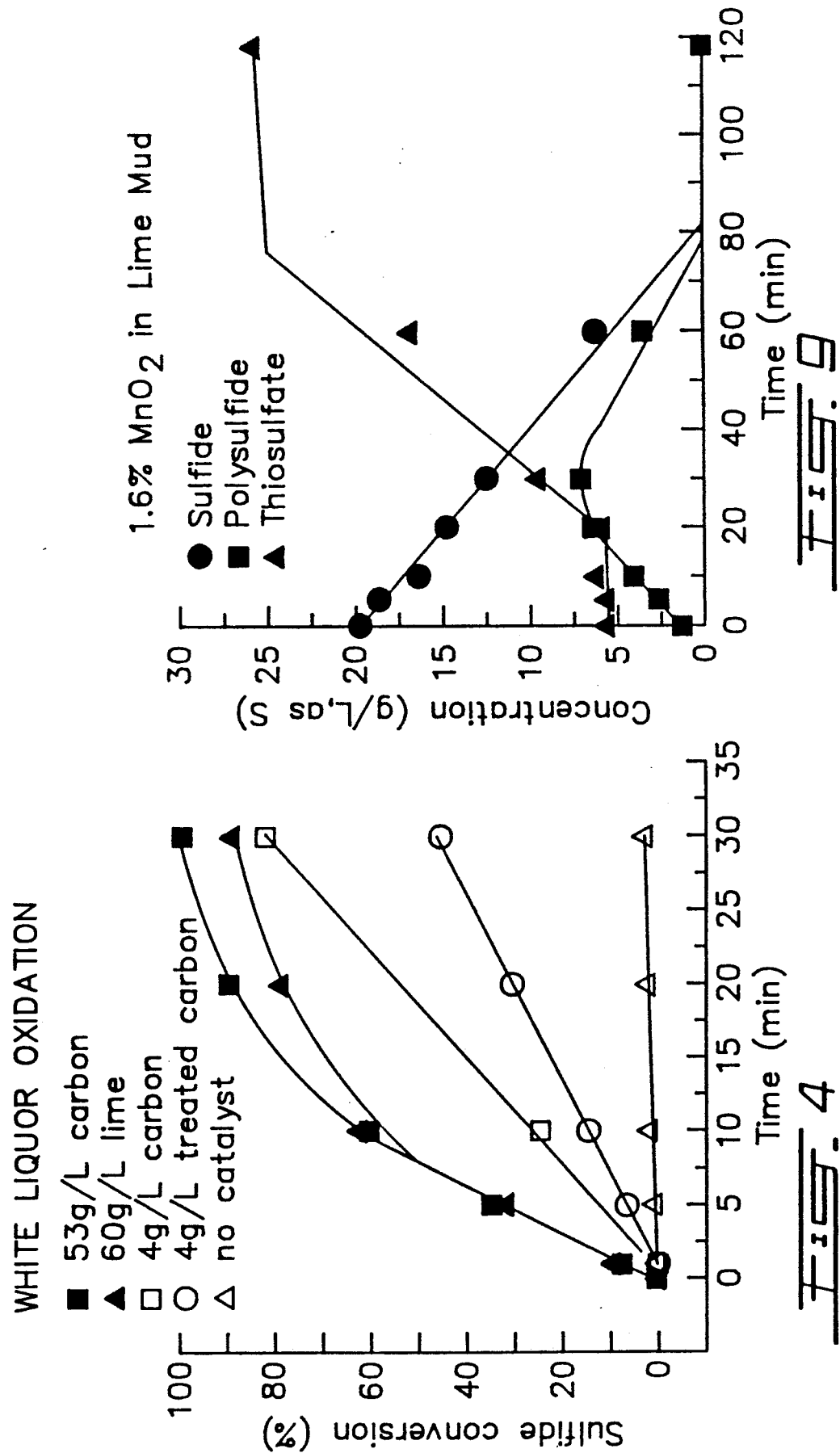
FIG. 4 is a graph of white liquor oxidation showing sulfide conversion against time for different catalysts.

The catalytic activity of lime mud was tested during the oxidation of white liquor with oxygen. FIG. 4 gives the percentage conversion of sulfide with and without suspended catalytic solids in white liquor during oxidation. The first series of tests were carried out wherein 0.75 liters of white liquor with sulfide concentration of 28 grams per liter (as $Na_2O$) were charged to the reactor. Oxygen at a rate of 0.7 liters per minute was then sparged in the liquors, kept at 100° C. and agitated at a constant stirrer speed of 1900 rpm for thirty minutes. Curve A represents the oxidation of white liquors without a catalyst. By adding activated carbon at concentrations of 4 and 53 grams per liter, curves C and E respectively were produced. For curve B an activated carbon aliquot coated with a polyethylene film to produce a hydrophobic carbon catalyst, similar to that used in the process described in U.S. Pat. No. 4,024,229, was added to the reactor to give a concentration of 4 grams per liter. Finally to produce curve D, (i.e. oxidation carried out in presence of lime mud particles), a mill reburned lime with an available lime content of 94% was added to 0.75 liters of green liquor whose sulfide concentration was also 28 g/L (as $Na_2O$). The lime-to-liquor ratio was 60 g/L of green liquor which corresponds to a typical lime dosage in the recausticizing plant of a kraft mill. After causticizing the green liquor with the lime for two hours at 100° C., the concentration of lime mud particles was approximately 105 g/L which is also typical of a mill operation. The oxidation reaction was then started at conditions identical to those used during the oxidation of white liquor with and without carbon particles added.

These results indicate that the rate of oxidation increased drastically when carbon, wet-proof carbon or lime mud was suspended in the liquor. As can be seen, the catalytic activity of lime mud particles during the oxidation of sulfide in white liquor with oxygen was comparable with that of activated carbon, a known and expensive catalyst. Because the polysulfide and thiosulfate concentrations were not monitored during these oxidation reactions, nothing can be concluded from these tests on the selectivity of lime mud particles towards the production of polysulfide.

The next series of tests illustrate the effectiveness of variables on the rate of sulfide oxidation and on the selectivity of lime mud under different operating conditions towards polysulfide generation. The polysulfide efficiency is defined here as follows:

sodium polysulfide efficiency =

$$\frac{\text{sodium polysulfide formed by weight} \times 100}{\text{converted sodium sulfide by weight}}$$

where the polysulfide formed and the converted sulfide during the oxidation are all expressed as g/L on a sulfur basis. An efficiency of about 100% indicates that all oxidized sulfide was converted to polysulfide sulfur whereas an efficiency lower than 100% reveals the simultaneous formation of thiosulfate.

For examples 2 to 6, each green liquor sample had an initial temperature of 90° C. and was causticized with reburned lime at a constant stirrer speed of 1000 rpm. This degree of agitation when translated to a mill scale reactor represents relatively mild agitation conditions. At the end of the causticizing, the white liquor temperature had increased from 90° to 100° C. as a result of the exothermic reaction of lime hydration. After the 100 minutes causticizing time, a small sample of liquor was removed for analysis. This sample was the zero time oxidation sample. The gas valve for air or oxygen was then opened to the reactor to permit the oxidation reaction to proceed. Except for example 6, the oxidation time was sixty minutes which is below the total retention time available in mill causticizers. The temperature during the oxidations ranged normally between about 100° and 104° C.

Prior to each oxidation test a fresh lime mud suspension in white liquor was produced in the reactor shown in FIG. 3 by adding 45 grams of reburned lime to 0.75 liters of green liquor samples whose sulfide concentrations ranged between 19 and 22 g/L (as S). The reburned lime used in all experiments was collected from the lime kiln of a kraft mill and had the chemical composition given in Table I.

| CaO (%) | Na$_2$O (%) | MgO (%) | MnO$_2$ (%) | Fe$_2$O$_3$ (%) | Al$_2$O$_3$ (%) | SiO$_2$ (%) | SO$_4$ (%) | CO$_3$ (%) |
|---|---|---|---|---|---|---|---|---|
| 92.0 | 1.22 | 0.82 | 0.03 | 0.189 | 0.11 | 0.36 | 3.0 | 3.0 |

This lime can be considered as low in impurities and is typically obtained in mills with an efficient dregs removal operation and/or a low degree of closure in the lime mud cycle.

EXAMPLE 2

Figure 5:
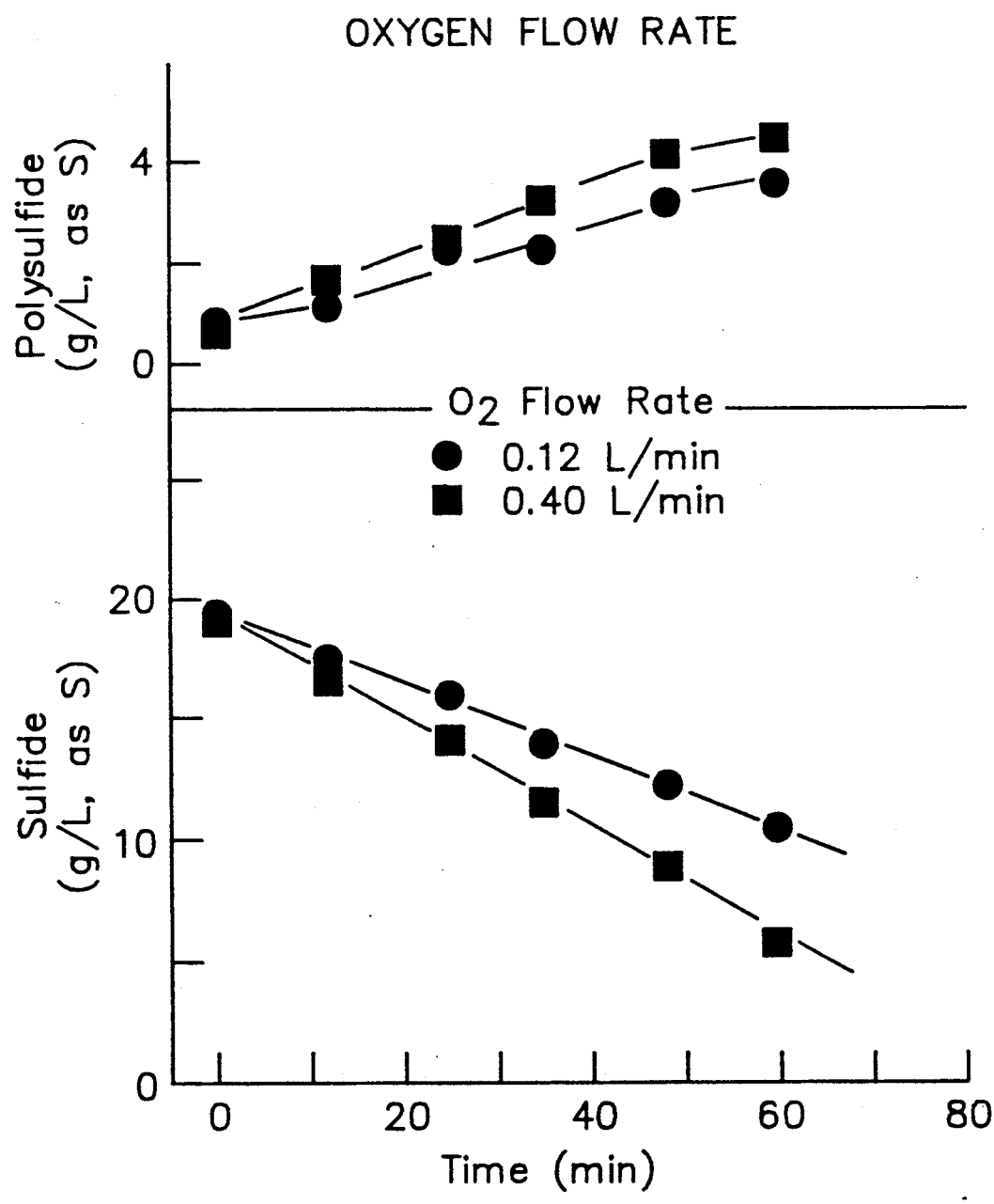
FIG. 5 is a graph showing different oxygen flow rates comparing sulfide conversion to polysulfide on a time base.

The effect on white liquor oxidation of increasing the flow rate of oxygen from 0.12 to 0.4 L/min. is shown in FIG. 5. For these two oxidations, the initial sulfide concentration was 19.3 g/L (as S) and the rotational speed of the impeller was 1400 rpm. An increase of oxygen flow rate increased both the rate of oxidation and the polysulfide formation. The polysulfide efficiency was similar at the two flow rates being approximately 30% at the highest polysulfide concentrations. These results indicate that when the oxidation was carried out with oxygen in the presence of lime mud, polysulfide was formed in significant quantities, but the major product of oxidation was sodium thiosulfate. Under these conditions the polysulfide efficiency was lower than that obtained in the process according to U.S. Pat. No. 4,024,229.

EXAMPLE 3

Figure 6:
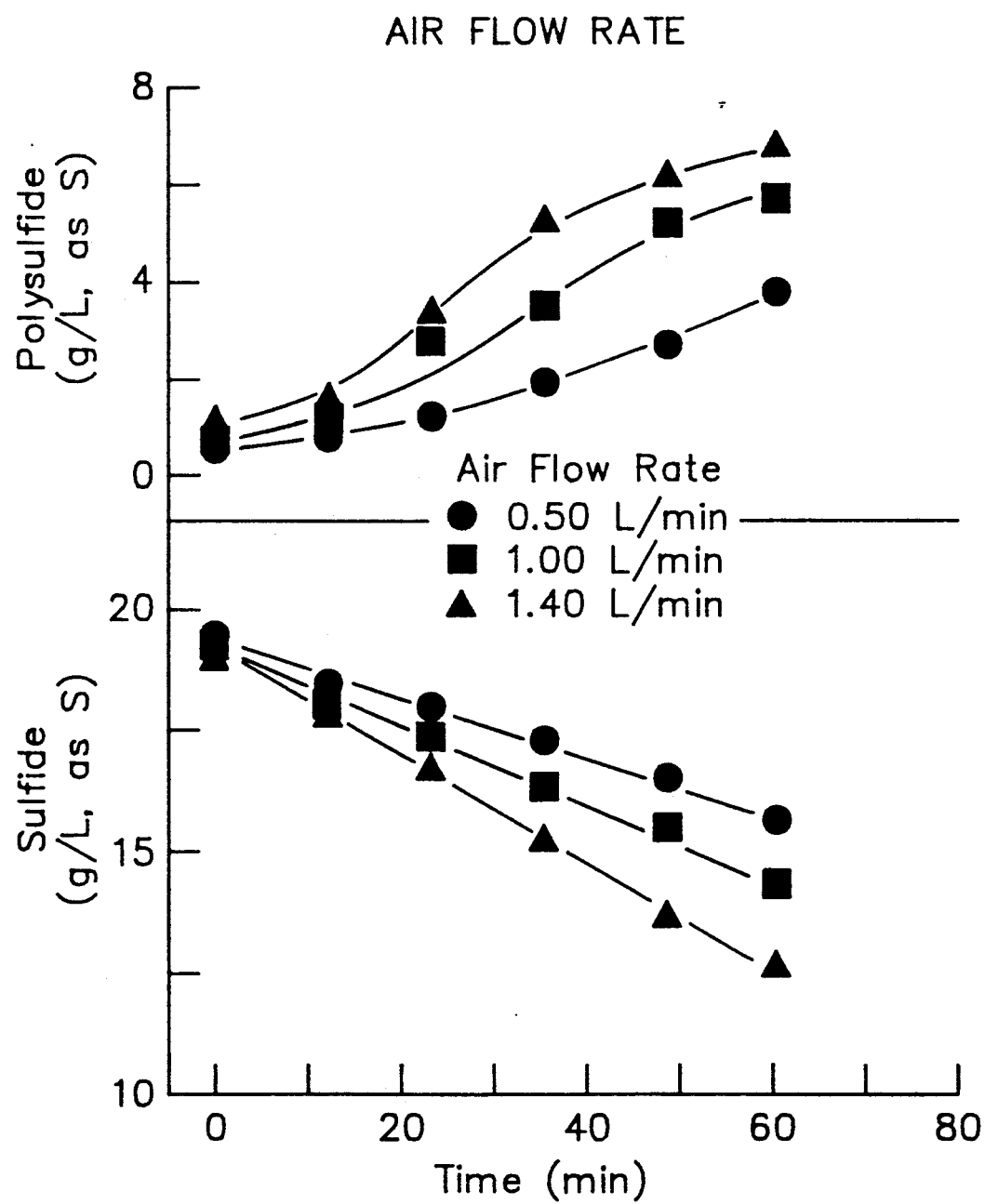
FIG. 6 is a graph showing the variation in air flow rate comparing conversion of sulfide to polysulfide on a time base.

For this series of oxidations, oxygen was substituted with air, which is the usual oxidant in the process disclosed in U.S. Pat. No. 4,024,229. The effect on oxidation of varying the air flow rate from 0.50 L/min. to 1.4 L/min. is shown in FIG. 6. These results show that the rate of sulfide oxidation as well as the extent of polysulfide formation increased with air flow rate. Although the rates of sulfide oxidation with air were much lower than with oxygen when compared on an equal oxygen basis, the polysulfide efficiency was much higher with air than with oxygen. Indeed the polysulfide efficiencies with air were typically between 70 and 85% which compares well with those obtained in the process of U.S. Pat. No. 4,024,229.

The tests indicate that the activity and selectivity of the lime mud particles during the oxidation are affected by the oxidant gas. Thus the resistance to gas-liquid and liquid-solid mass transfer appear to be influenced by the total flow rate and the presence or not of nitrogen in the gas. (i.e. the partial pressure of oxygen)

EXAMPLE 4

Figure 7:
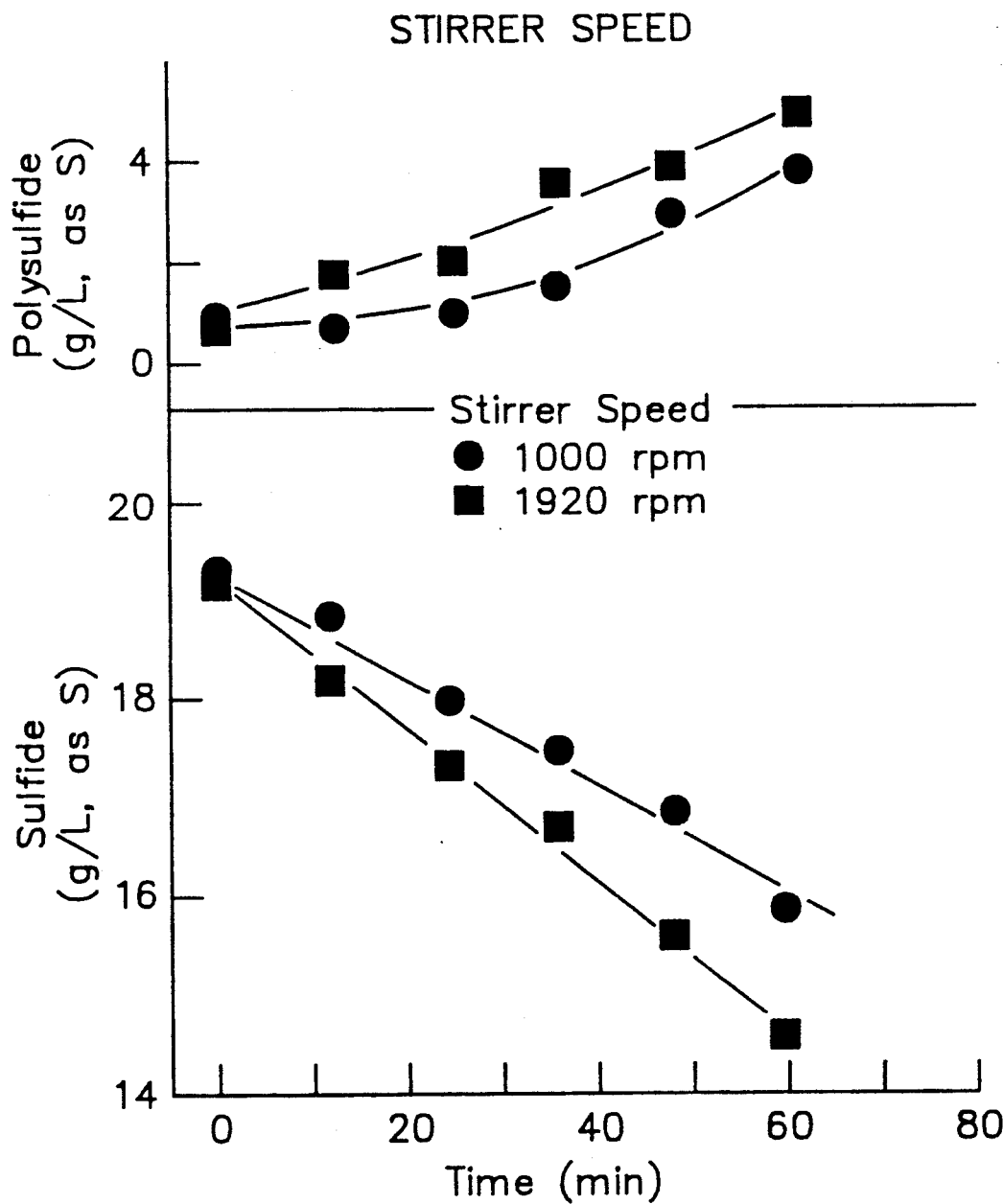
FIG. 7 shows a graph of two different stirrer speeds comparing sulfide conversion to polysulfide on a time base.

Tests were then performed to assess the effect of impeller rotational speed on white liquor oxidation. Air was used in both tests as the oxidant at a flow rate of 0.5 L/min. The effect of increasing of the rotational speed of the impeller from 1000 to 1920 rpm is shown in FIG. 7. With a 0.04 m diameter impeller used in the experiments, the blade tip speeds range from 2.09 to 4.02 meters/second, which is within the range encountered within commercial causticizers. With a more intense agitation, both the sulfide conversion and the polysulfide formation increased. The polysulfide efficiencies at 60 minutes oxidation time were approximately 75% for the two degrees of agitation. The tests indicate that the higher the rotational speed that can feasibly be obtained, the better.

EXAMPLE 5

Figure 8:
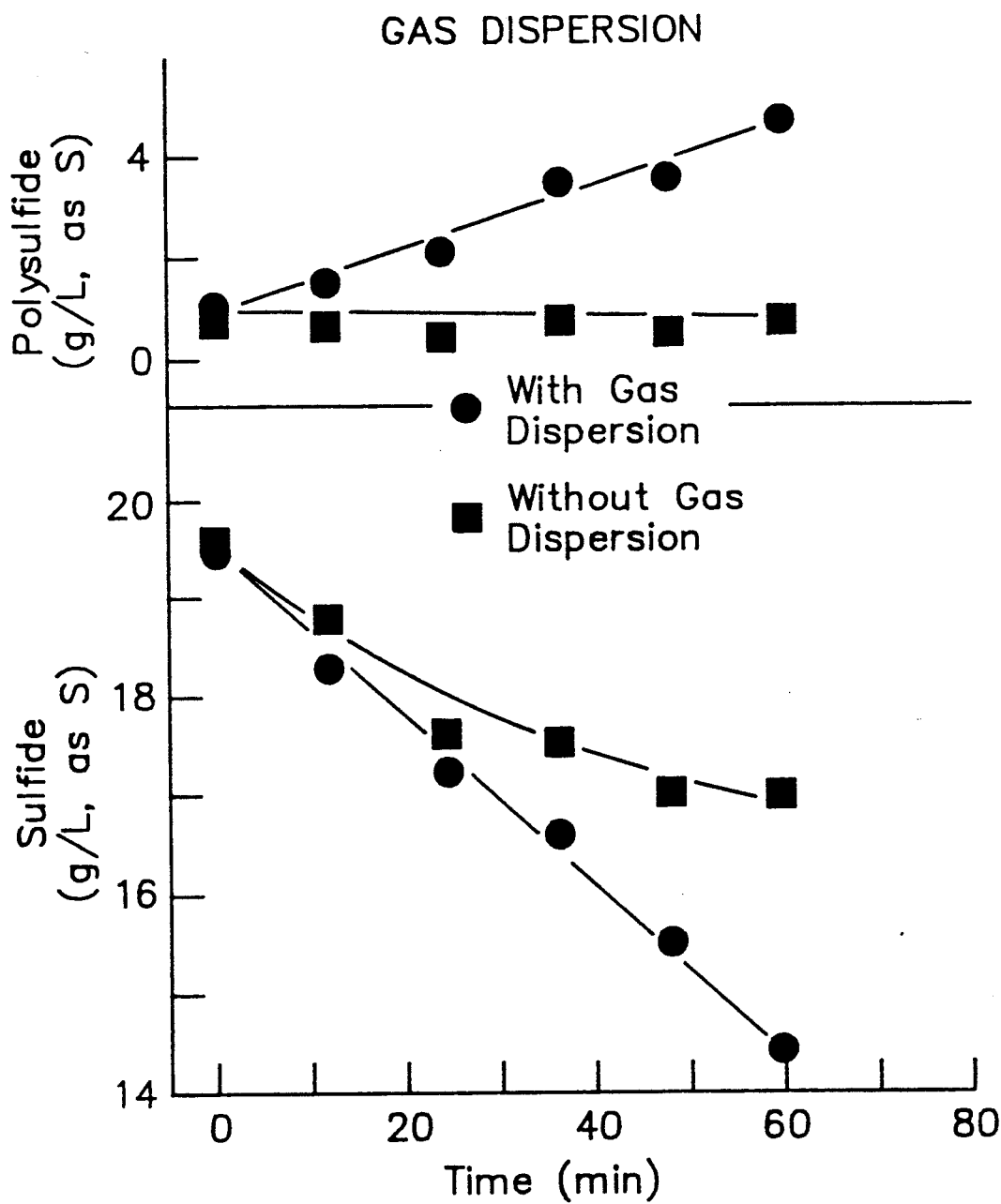
FIG. 8 shows a graph with gas dispersion and no gas dispersion comparing sulfide conversion to polysulfide on a time base.

Tests were carried out to establish whether the degree of dispersion of the gaseous oxidant in the mixture of lime mud and white liquor influenced the rate of oxidation. The gas sparger shown in FIG. 3 was removed and air was supplied in the reactor from a tubing (0.25 cm I.D.) placed under the impeller. The air flow rate was 0.50 L/min. and the stirrer speed 1400 rpm for the two oxidations with and without gas dispersion. As shown in FIG. 8, the rate of sulfide oxidation was reduced markedly and no polysulfide was formed when air was not dispersed with a sparger.

A low degree of dispersion of the oxidant gas in the lime mud suspension not only reduced the rate of oxidation, but also the polysulfide efficiency.

EXAMPLE 6

The addition of metallic oxidants such as manganese oxide to sulfide liquors is known to yield mostly polysulfides. The reburned lime, which has a very low level of impurity, was blended with MnO$_2$ in the proportions of 97 parts of lime and three parts of MnO$_2$. The weight percentage of MnO$_2$ in the lime mud after the causticizing reaction was 1.68%. During the two hours oxidation, the oxygen flow rate was 0.10 L/min. and the stirrer speed was 1950 rpm.

FIG. 9 reveals that the presence of small quantities of metallic oxidants such as mangnese oxide in the lime mud during the oxidation of white liquor with oxygen favors the formation of polysulfides up to approximately 50% sulfide conversion. The polysulfide efficiency at the maximum in polysulfide concentration was 80% which is much higher than the value of 30% as shown in Example 2 where no manganese oxide was added to the lime prior to the oxidation.

Whereas the 1.6% $MnO_2$ impurity figure of this test may be somewhat higher than a commercial process, comparable results were obtained with 0.5% $MnO_2$ impurity which is closer to a commercial figure.

The examples presented herewith should be considered as illustrative only because they were obtained in a laboratory reactor rather than a recausticizing plant of a kraft mill. Higher heights of liquors occur in mill reactors compared to a laboratory reactor and it is expected that lower flow rates of oxygen or air will be required at a mill scale to yield the same extent of sulfide oxidation.

Various changes may be made to the different embodiments of the process disclosed herein without departing from the scope of the present invention which is limited only by the following claims.

The embodiments of the invention in which an exclusive property or privilege is claimed are defined as follows:

1. In a process of producing kraft cooking liquor for addition to a digester for enhancement of the yield derived from pulping of wood chips in which all the black liquor obtained from kraft digested pulp is concentrated and burned, the resulting smelt is dissolved in water to produce a kraft green liquor, causticizing the resulting kraft green liquor with lime in a causticizer to produce a kraft white liquor for use in digestion, mixed with lime mud particles whose major component is calcium carbonate, the improvement comprising the steps of:

oxidizing the produced liquor mixed with lime mud particles in the causticizer or in a pipe line reactor directly connected to the causticizer, the liquor being oxidized consisting essentially of kraft white liquor to convert sodium sulfide in said white liquor to sodium polysulfide and sodium hydroxide, wherein the oxidation of said white liquor is effected by injecting small bubbles of an oxygen containing gas through a sparger into a suspension of said lime mud particles in said white liquor while agitating said suspension.

2. The process according to claim 1 wherein at least some of the sodium polysulfide is oxidized to sodium thiosulfate.

3. The process according to claim 2 wherein a sodium polysulfide efficiency of less than 100% is obtained, the efficiency calculated from the formula:

$$\text{sodium polysulfide efficiency} = \frac{\text{sodium polysulfide formed by weight} \times 100}{\text{converted sodium sulfide by weight}}$$

indicating sodium thiosulfate formation occurred beyond the percentage of sodium polysulfide formed.

4. The process according to claim 1 wherein substantially all the sodium sulfide is oxidized to sodium thiosulfate.

5. The process according to claim 3 wherein the sodium polysulfide efficiency is varied by changing the time for the oxidizing step.

6. The process according to claim 1 wherein the oxygen containing gas is oxygen.

7. The process according to claim 6 wherein the agitation of the suspension occurs during the oxidation step in a stirred reactor.

8. The process according to claim 1 wherein the oxygen containing gas is air.

9. The process according to claim 8 wherein the agitation of the suspension occurs during the oxidation step in a stirred reactor.

10. The process according to claim 3 wherein sodium sulfide conversion is approximately 50% and the sodium polysulfide efficiency is about 80%.

11. The process according to claim 3 wherein the oxidation step occurs within a temperature range of about 90° to 105° C.

12. The process according to claim 3 wherein the oxidation step occurs above atmospheric pressure.

13. The process of claim 12 wherein the oxidation step occurs in a pipe line reactor.

* * * * *